No. 609,561. Patented Aug. 23, 1898.
J. J. SHELTON.
AUTOMATIC SELF SETTING ANIMAL TRAP.
(Application filed Jan. 20, 1898.)
(No Model.)
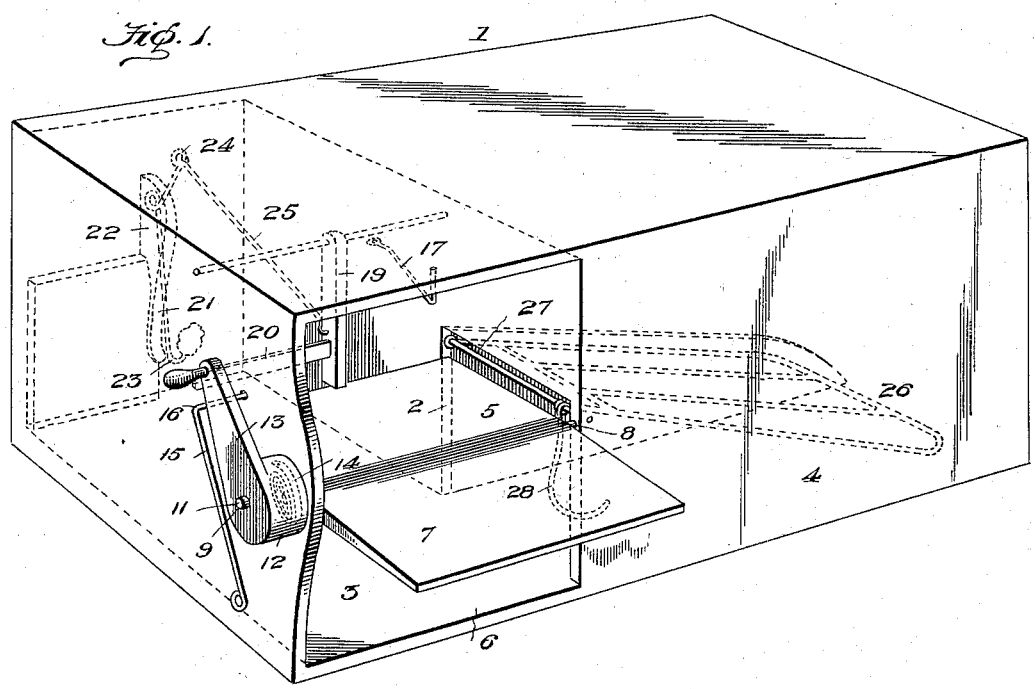
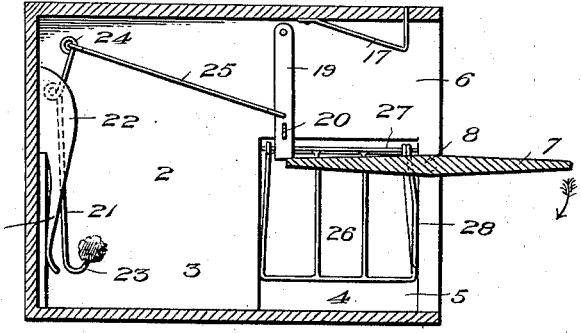
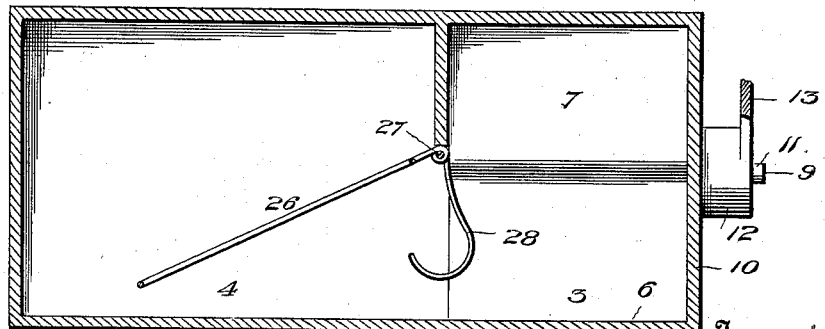
Witnesses
Inventor
John J. Shelton
Attorneys

United States Patent Office.

JOHN J. SHELTON, OF TEA, MISSOURI, ASSIGNOR OF ONE-HALF TO HERMANN H. ISENBERG, OF SAME PLACE.

AUTOMATIC SELF-SETTING ANIMAL-TRAP.

SPECIFICATION forming part of Letters Patent No. 609,561, dated August 23, 1898.

Application filed January 20, 1898. Serial No. 667,283. (No model.)

*To all whom it may concern:*

Be it known that I, JOHN J. SHELTON, a citizen of the United States, residing at Tea, in the county of Gasconade and State of Missouri, have invented certain new and useful Improvements in Automatic Self-Setting Animal-Traps; and I do declare the following to be a full, clear, and exact description of the invention, such as will enable others skilled in the art to which it appertains to make and use the same.

My invention relates to improvements in self-setting animal-traps, and more particularly to that class of ever-set traps in which the normally open door of the bait-chamber is automatically closed to cut off retreat when the animal reaches the bait and is automatically opened or "reset" by a gate which the animal raises when passing from the bait-chamber into the cage; and the object is to simplify the construction and increase the efficiency of the trap.

To this end the invention consists in the construction, combination, and arrangement of the device, as will be hereinafter more fully described, and particularly pointed out in the claim.

The accompanying drawings show my invention in the best form now known to me; but many changes in the details might be made within the skill of a good mechanic without departing from the spirit of my invention as set forth in the claim at the end of this specification.

The same reference characters indicate the same parts of the device in the several views.

Figure 1 is a perspective view of my improved animal-trap with a portion broken away to show the interior of the bait-chamber and cage. Fig. 2 is a longitudinal section through the bait-chamber. Fig. 3 is a longitudinal section through the trap in line with the gate.

1 represents the trap proper and is preferably rectangular in form and may be of any suitable dimensions to conform to the end in view.

2 denotes a transverse partition which divides the trap into the bait-chamber 3 and the cage 4, and it is formed with a passageway 5 to permit the trapped animal to pass from the bait-chamber into the cage.

6 represents the entrance to the bait-chamber, and 7 denotes a horizontally-rotating door centrally fixed on a horizontal shaft 8, one end of which is journaled in a suitable recess in the frame, and the opposite end 9 extends through a suitable bearing in the end wall 10. This projecting end 10 is formed with a collar 11, and between said collar and the end wall is loosely journaled the hollow hub 12 of a crank 13, and a spiral spring 14 encompasses the shaft 8, one end being fixed to said shaft and the opposite end fixed to the hub, the entire spring being housed or concealed within the hub, and its tension is exerted to continuously rotate the shaft and door in the same direction.

15 represents a spring-pawl fixed to the end wall 10, and it is formed with a transverse arm 16, which extends across the path of the crank 13 to retain the tension of the spring when wound up.

17 represents a spring-pawl fixed in the top or cover, and it is formed with a vertical arm 18, which projects into the path of the upper edge of the rotating door to prevent its reverse movement when sprung.

19 denotes a depending pawl pivoted at its upper end to the top of the bait-chamber and having its free end projecting into the path of the inner edge of the door to retain it in an open horizontal position when set, and 20 represents a leaf-spring which normally holds the pawl in the path of said door.

21 represents the trigger, fulcrumed on the bracket 22, fixed to the rear wall of the bait-chamber, and its lower end terminates in a hook 23 to receive the bait, while its upper end terminates in an eye 24, from which a rod 25 extends to the pawl 19.

26 denotes the inclined gate, pivoted on the rod 27, and it is provided with an integral curved arm 28, which projects into the path of the lower edge of the door 7 when the latter is closed. The bracket 22 is formed with an integral spring-arm 29, which is adapted to retain a mirror in position against the rear wall of the bait-chamber immediately opposite the entrance 6 to assist in luring the animal into the trap.

The operation is as follows: The parts being in the position shown in Fig. 2, the animal enters the bait-chamber and in pulling the bait forward releases the pawl 19, so that the spring 14 rotates the door one-quarter of a circle, which carries it to a vertical position, and it is held in this position by the arm 28 on the gate 26, thus effectually closing the entrance 6, and the animal, finding its retreat cut off, passes through the passage 5 into the cage, and in so doing passes under and raises the gate 26, which carries with it the arm 28, thus releasing the door and permitting the spring 14 to rotate it until its lower end comes in contact with the depending pawl 19, which sets it ready for the next animal.

Having thus fully described my invention, what I claim as new and useful, and desire to secure by Letters Patent of the United States, is—

In a self-setting animal-trap, comprising the bait-chamber 3, provided with the entrance 6, the cage 4, separated by the partition 2 formed with the passage-way 5, the horizontal shaft 8 and the door 7 fixed on said shaft in said entrance, the crank 13 loosely journaled on the projecting end of said shaft, the spring 14 connected at its inner end to said shaft and at its outer end to said crank and the spring-pawl 15 having its free end projecting into the path of said crank, in combination with the spring-pawl 17 projecting into the path of the upper end of said door, the depending pawl 19, the spring 20 actuating said pawl 19, the trigger 21 and the rod 25 connecting said trigger and pawl 19, and the inclined gate 26 pivoted across the passage-way 5 and provided with the integral curved arm 28 projecting into the path of said door, substantially as shown and described.

In testimony whereof I hereunto affix my signature in presence of two witnesses.

JOHN J. SHELTON.

Witnesses:
W. T. ROBINSON,
W. T. ANGELL.